US012810493B2

(12) United States Patent
Bak

(10) Patent No.: US 12,810,493 B2
(45) Date of Patent: Nov. 24, 2026

(54) ELECTRONIC DEVICE FOR IMAGE PROCESSING AND METHOD FOR OPERATING SAME

(71) Applicant: SAMSUNG ELECTRONICS CO., LTD., Suwon-si (KR)

(72) Inventor: Bonggil Bak, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 22 days.

(21) Appl. No.: 18/972,255

(22) Filed: Dec. 6, 2024

(65) Prior Publication Data

US 2025/0104295 A1 Mar. 27, 2025

Related U.S. Application Data

(63) Continuation of application No. PCT/KR2023/005750, filed on Apr. 27, 2023.

(30) Foreign Application Priority Data

Jun. 17, 2022 (KR) ........................ 10-2022-0074289

(51) Int. Cl.
*G06T 11/00* (2026.01)
*G06T 5/20* (2006.01)
(Continued)

(52) U.S. Cl.
CPC ................ *G06T 11/00* (2013.01); *G06T 5/20* (2013.01); *G06T 5/77* (2024.01); *G06T 7/11* (2017.01);
(Continued)

(58) Field of Classification Search
CPC ... G06T 11/00; G06T 5/20; G06T 5/77; G06T 7/11; G06T 7/194; G06T 7/90;
(Continued)

(56) References Cited

U.S. PATENT DOCUMENTS 8,144,173 B2 3/2012 Baba et al.
8,295,629 B2 10/2012 Wey et al.
(Continued)

FOREIGN PATENT DOCUMENTS

CN 102209246 A 10/2011
JP 2002-118770 4/2002
(Continued)

OTHER PUBLICATIONS

International Search Report dated Jul. 26, 2023 in PCT Application No. PCT/KR2023/005750.
(Continued)

*Primary Examiner* — Vijay Shankar
(74) *Attorney, Agent, or Firm* — STAAS & HALSEY LLP

(57) ABSTRACT

An electronic device comprising a memory; a camera; a communication unit; and at least one processor electrically connectable to the memory, the camera, and the communication unit. The at least one processor to: extract a frame from an image including a plurality of frames; identify an RGB vector of the frame; determine a light source vector by filtering the RGB vector of the frame through a first filter; identify an illuminance value of the frame; determine an illuminance value in relation to a composite image by filtering the illuminance value of the frame through a second filter; and generate synthetic light source information on the basis of the light source vector and the illuminance value in relation to the composite image.

20 Claims, 8 Drawing Sheets

(51) Int. Cl.

| | |
|---|---|
| ***G06T 5/77*** | (2024.01) |
| ***G06T 7/11*** | (2017.01) |
| ***G06T 7/194*** | (2017.01) |
| ***G06T 7/90*** | (2017.01) |
| ***G06V 10/56*** | (2022.01) |
| ***G06V 10/60*** | (2022.01) |
| ***G06V 20/20*** | (2022.01) |

(52) U.S. Cl.
CPC ................ *G06T 7/194* (2017.01); *G06T 7/90* (2017.01); *G06V 10/56* (2022.01); *G06V 10/60* (2022.01); *G06V 20/20* (2022.01); *G06T 2207/10024* (2013.01); *G06T 2207/20132* (2013.01)

(58) Field of Classification Search
CPC . G06T 2207/10024; G06T 2207/20132; G06T 5/90; G06T 2207/20221; G06T 5/50; G06V 10/56; G06V 10/60; G06V 20/20; H04N 5/272; H04N 5/77
See application file for complete search history.

(56) References Cited

U.S. PATENT DOCUMENTS

| | | | | |
|---|---|---|---|---|
| 9,390,482 | B2 | 7/2016 | Lee et al. | |
| 10,950,036 | B2 | 3/2021 | Ha et al. | |
| 11,323,678 | B2 | 5/2022 | Bogusz et al. | |
| 11,663,796 | B2 | 5/2023 | Ha et al. | |
| 12,501,122 | B2 * | 12/2025 | Nakano | H04N 23/10 |
| 12,586,207 | B2 * | 3/2026 | Sun | G06T 7/194 |
| 2011/0145150 | A1 | 6/2011 | Onischuk | |
| 2022/0070389 | A1 | 3/2022 | Tangeland et al. | |
| 2024/0007725 | A1 * | 1/2024 | Nakano | H04N 23/10 |
| 2024/0185431 | A1 * | 6/2024 | Sun | G06T 7/194 |
| 2025/0014148 | A1 * | 1/2025 | Cho | G06V 10/44 |

FOREIGN PATENT DOCUMENTS

| | | |
|---|---|---|
| JP | 2010-532629 | 10/2010 |
| JP | 5494537 | 5/2014 |
| KR | 10-2010-0097213 | 9/2010 |
| KR | 10-1373631 | 3/2014 |
| KR | 10-2014-0072386 | 6/2014 |
| KR | 10-1442153 | 9/2014 |
| KR | 10-1595888 | 2/2016 |
| KR | 10-2016-0066502 | 6/2016 |
| KR | 10-2019-0112894 | 10/2019 |
| KR | 10-2021-0126934 | 10/2021 |

OTHER PUBLICATIONS

Written Opinion dated Jul. 26, 2023 in PCT Application No. PCT/KR2023/005750.

Subhashdas et al. "Illuminant Chromaticity Estimation via Optimization of RGB Channel Standard Deviation", Journal of the Institute of Electronics and Information Engineers, vol. 53, No. 6, pp. 110-121, Jun. 2016.

Korean Office Action issued Oct. 29, 2026 for Application No. 10-2022-0074289.

* cited by examiner

ELECTRONIC DEVICE FOR IMAGE PROCESSING AND METHOD FOR OPERATING SAME

CROSS REFERENCE TO RELATED APPLICATION

This application is a continuation application, under 35 U.S.C. § 111(a), of international application No. PCT/KR2023/005750, filed Apr. 27, 2023, which claims priority under 35 U. S. C. § 119 to Korean Patent Application No. 10-2022-0074289, filed Jun. 17, 2022, the disclosures of which are incorporated herein by reference in their entireties.

TECHNICAL FIELD

Embodiments of the disclosure relate to an electronic device for image processing and a method for operating the same.

BACKGROUND ART

As remote conferencing services based on video communication technology are widely introduced, virtual background technology, which overlays a conference participant image captured in real-time through a video camera onto an arbitrary background image or background image, has been introduced.

In this regard, the difference in camera optical characteristics between the background image and the foreground image (e.g., the image of the conference participant being captured in real-time) may cause heterogeneity in the composite image. Color matching methods are being developed to minimize the heterogeneity.

DETAILED DESCRIPTION OF THE INVENTION

Technical Problem

Various embodiments of the disclosure provide an image processing device for minimizing heterogeneity due to a difference in the light source of each image or lighting when synthesizing two images including multiple frames and a method for operating the same.

Further, there may be provided an electronic device for preventing an abrupt change in brightness of a foreground image due to a change in brightness occurring only in some pixels and a method for operating the same.

Further, there may be provided an electronic device for providing a heterogeneity-free composite image by real-time reflecting an abrupt change in brightness of the background image and a method for operating the same.

Technical Solution

An electronic device according to an embodiment of the disclosure may comprise a memory, a camera, a communication unit, and at least one processor electrically connectable to the memory, the camera, and the communication unit. The at least one processor may extract a frame from an image including a plurality of frames, identify an RGB vector of the frame, determine a light source vector by filtering the RGB vector of the frame through a first filter, identify an illuminance value of the frame, determine an illuminance value in relation to a composite image by filtering the illuminance value of the frame through a second filter, and generate composite light source information based on the light source vector and the illuminance value in relation to the composite image.

A method for operating an electronic device, according to an embodiment of the disclosure, may comprise extracting a frame from an image including a plurality of frames, identifying an RGB vector of the frame, determining a light source vector by filtering the RGB vector of the frame through a first filter, identifying an illuminance value of the frame, determining an illuminance value in relation to a composite image by filtering the illuminance value of the frame through a second filter, and generating composite light source information based on the light source vector and the illuminance value in relation to the composite image.

Advantageous Effects

According to various embodiments of the disclosure, it is possible to minimize heterogeneity that may occur when synthesizing images having different light source characteristics.

Further, according to various embodiments, it is possible to minimize an abrupt change in brightness due to some pixels that may occur in a composite image.

Further, according to various embodiments, it is possible to quickly reflect an abrupt change in illuminance occurring in the background image to the foreground image.

Effects obtainable from the disclosure are not limited to the above-mentioned effects, and other effects not mentioned may be apparent to one of ordinary skill in the art from the following description.

BRIEF DESCRIPTION OF THE DRAWINGS

In connection with the description of the drawings, the same or similar reference numerals may be used to denote the same or similar elements.

MODE FOR CARRYING OUT THE INVENTION

Figure 1:
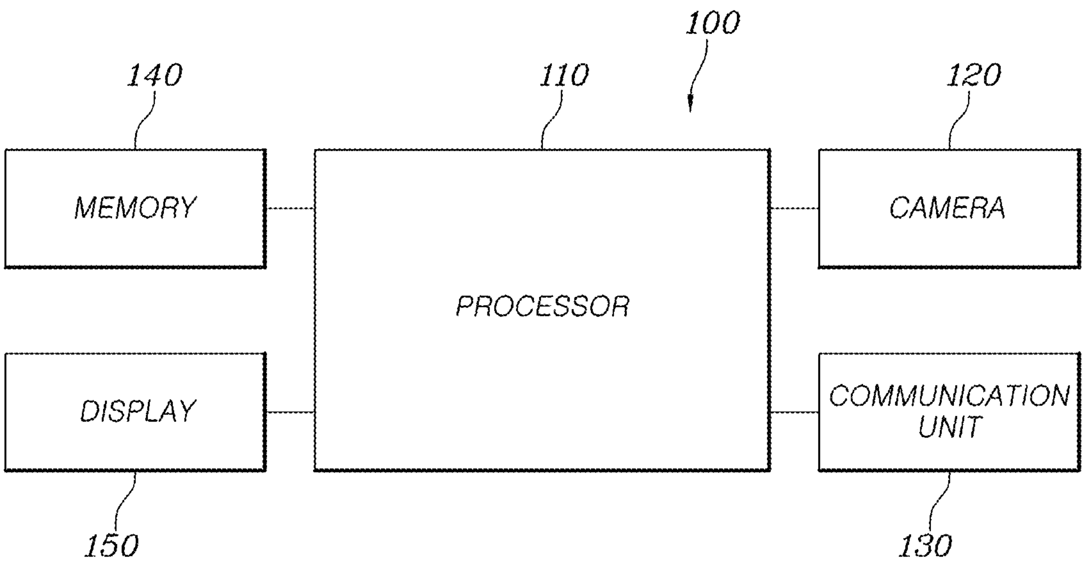
FIG. 1 is a block diagram illustrating a configuration of an electronic device according to an embodiment.

The embodiments described in the disclosure and the configurations illustrated in the drawings are merely examples of the disclosed invention, and there may be various modifications that may replace the embodiments and drawings of the disclosure at the time of filing of the present application. The terms as used herein are provided merely to describe some embodiments thereof, but not intended to limit the present invention.

The 'unit' in the disclosure may be implemented in software or hardware and, according to embodiments, a plurality of 'units' may be implemented as one component or one 'unit' may include a plurality of components. Further, the term "unit," "device," "block," "member," or "module" may mean a unit of processing at least one function or operation. For example, the terms may mean a process processed by software or a processor stored in memory or by hardware (e.g., a circuit).

As used herein, the singular forms "a," "an," and "the" may include the plural forms as well, unless the context clearly indicates otherwise. Further, the terms "first" and "second" are used to distinguish one part from another and do not represent the order of the parts unless stated otherwise.

The terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Further, the terms including ordinal numbers such as "first" and "second" are used to distinguish one component from another, and do not limit the components.

The present invention may be shown in functional block components and various processing steps. The functional blocks may be implemented in various numbers of hardware or software components executing specific functions. For example, the present invention may adopt integrated circuit components such as memory, processing, logics, or lookup tables that are capable of executing various functions by other control devices or under the control of one or more microprocessors. Like the components of the present invention are executable by software programming or software elements, the present invention may be implemented in a programming or scripting language such as C, C++, Java, or assembler by including various algorithms implemented as a combination of data architectures, processes, routines, or other programming components. The functional aspects may be implemented in an algorithm executed on one or more processors. Further, the present invention may adopt the conventional art for, e.g., electronic environment settings, signal processing, and/or data processing. The terms such as mechanism, element, means, or component may be widely used and do not limit mechanical or physical components. The terms may encompass a series of routines of software in association with, e.g., a processor.

Hereinafter, embodiments of the present disclosure are described with reference to the accompanying drawings. However, it should be appreciated that the present disclosure is not limited to the embodiments, and all changes and/or equivalents or replacements thereto also belong to the scope of the present disclosure. In the following description, the same/similar reference numerals are used to denote substantially the same components, and no duplicate description is given.

FIG. 1 is a block diagram illustrating a configuration of an electronic device according to an embodiment.

Referring to FIG. 1, an electronic device 100 according to an embodiment may include various types of electronic devices including a display device and capable of image processing and image synthesis. The electronic device according to an embodiment may include a notebook PC, a desktop PC, a tablet PC, a smart phone, a high definition television (HDTV), a smart TV, a 3-dimensional (3D) TV, an Internet protocol television (IPTV), a home theater, or the like.

The electronic device 100 according to an embodiment may include a processor 110, a camera unit 120, a communication unit 130, a memory unit 140, and a display unit 150. The block configuration of the electronic device 100 illustrated in FIG. 1 illustrates only components necessary for the description of the present invention, and other components necessary for performing the function of the electronic device may be included.

The camera unit 120 according to an embodiment may include a lens, an image sensor such as a charged coupled device (CCD), a complementary metal oxide semiconductor (CMOS), and an analog-to-digital converter.

The camera unit 120 according to an embodiment may obtain an image or video by capturing a space including a subject and a background area. The camera unit 120 may convert the obtained image or video into a digital signal and transmit the digital signal to the processor 110. The processor 110 described below may process the image or video converted into the digital signal.

The camera unit 120 according to an embodiment may include an external device connected to the electronic device 100. For example, the camera unit 120 may include an external electronic device (e.g., an external cam, an external camera, another external electronic device including a camera, etc.) that is present separately from the electronic device 100 and is connected to the electronic device 100, rather than a component included in the electronic device 100.

The electronic device 100 according to an embodiment may include a communication unit 130 for communicating with a server (not shown) or an external device (not shown). In an embodiment, the communication unit 130 may receive an image or video from an external device (not shown). In an embodiment, the communication unit 130 may include a short-range communication unit, a mobile communication unit, and a broadcast receiving unit.

In an embodiment, the short-range communication unit may include, but is not limited to, a Bluetooth communication unit, a Bluetooth low energy (BLE) communication unit, a near field communication unit, a WLAN (Wi-Fi) communication unit, a Zigbee communication unit, an infrared data association (IrDA) communication unit, a Wi-Fi direct (WFD) communication unit, an ultra-wideband (UWB) communication unit, an Ant+ communication unit, etc.

In an embodiment, the mobile communication unit may transmit and receive a wireless signal to and from at least one of a base station, an external device, and a server on a mobile communication network. The wireless signal may include various types of data according to transmission and reception of a voice call signal, a video call signal, or a text/multimedia message.

In an embodiment, the broadcast receiving unit may receive a broadcast signal and/or broadcast-related information from the outside through a broadcast channel. The broadcast channel may include a satellite channel and a terrestrial channel.

The memory unit 140 according to an embodiment may include at least one type of storage medium of flash memory types, hard disk types, multimedia card micro types, card types of memories (e.g., SD or XD memory cards), random access memories (RAMs), static random access memories (SRAMs), read-only memories (ROMs), electrically erasable programmable read-only memories (EEPROMs), programmable read-only memories (PROMs), magnetic memories, magnetic disks, or optical discs.

The memory unit 140 according to an embodiment may store data related to the image or video obtained through the camera unit 120. In an embodiment, the memory unit 140 may store data related to the image or video obtained through the camera unit 120 or the communication unit 130. In an embodiment, the memory unit 140 may store data (data related to light source information, data related to illuminance information, data related to the subject area, and data related to the background area) generated for the image or video by the processor 110. In an embodiment, the memory unit 140 may store the light source information, in the form of metadata, along with the image data. Further, the memory unit 140 may store various types of data necessary to synthesize two different images or videos.

The display unit 150 according to an embodiment may display the image synthesized through the processor 110. In an embodiment, the display unit 150 may display a composite image in which the foreground image real-time obtained by the camera unit 120 or the communication unit 130 and the background image stored in the memory unit 140 are synthesized. In an embodiment, the display unit 150 may display a composite image in which the background image real-time obtained by the camera unit 120 or the communication unit 130 and the foreground image stored in the memory unit 140 are synthesized.

In an embodiment, the display unit 150 may include a touch panel to be used as an input device. The display unit 150 may be implemented as a liquid crystal display, a thin film transit-liquid crystal display, an organic light-emitting diode, a flexible display, a 3D display, or the like.

The background image refers to an image displayed in the background area of the composite image, and the foreground image refers to an image displayed in the foreground area of the composite image. When the light source of the foreground image does not match the light source of the image displayed on the background image, the subject displayed on the foreground image may not be naturally synthesized with the background image but may be displayed relatively brightly or darkly. In other words, when the light source (e.g., the fluorescent lamp) of the space in which the foreground image is being captured and the light source (e.g., the sun or the indirect light source) of the space in which the background image is being captured are different from each other, the user viewing the composite image may feel the sense of heterogeneity between the background image and the foreground image. According to various embodiments of the disclosure, there are disclosed an electronic device for providing the user with a vivid composite image by minimizing a sense of heterogeneity that may occur in the composite image due to a difference in light source, and a method for operating the same.

Figure 2:
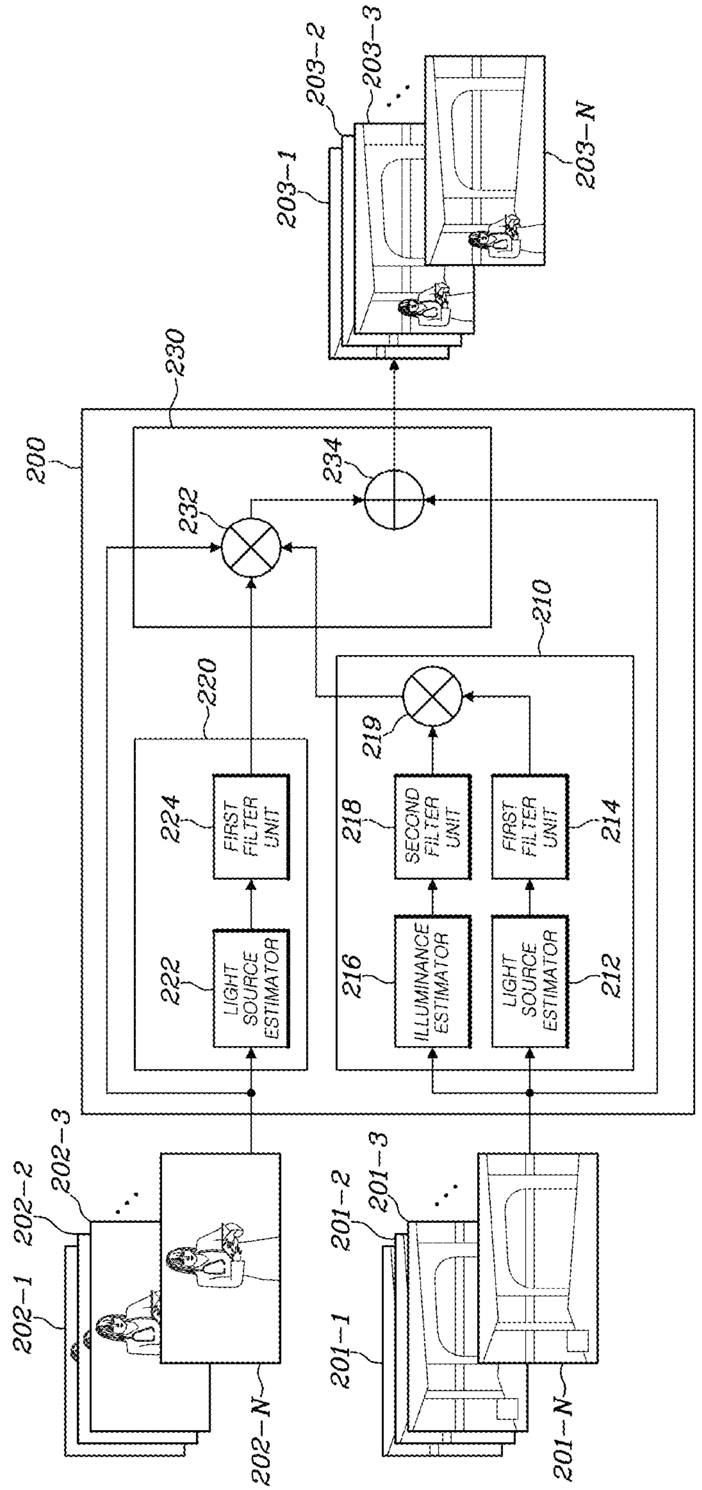
FIG. 2 illustrates a block configuration of a processor according to an embodiment.

FIG. 2 illustrates a block configuration of a processor of an electronic device according to an embodiment. The processor 200 of FIG. 2 may represent the processor 110 of the electronic device 100.

Referring to FIG. 2, the processor 200 according to an embodiment may include a background image processor 210, a foreground image processor 220, and an image blending processor 230. The foreground image may refer to an image including an object or a subject, and may refer to an image included in the foreground area in the composite image. The background image may refer to an image synthesized as a background of the foreground image.

In an embodiment, the background image 201 may include a plurality of first frames 201-1, 201-2, . . . , 201-N. In an embodiment, the foreground image 202 may include a plurality of second frames 202-1, 202-2, 202-3, . . . , 202-N. In an embodiment, the composite image 203 may include a plurality of third frames 203-1, 203-2, 203-3, . . . , 203-N. FIG. 2 illustrates that the background image 201, the foreground image 202, and the composite image 203 all include N frames, but this is merely an example, and each image may include a different number of frames.

In an embodiment, the background image 201 may include data captured through a camera (e.g., the camera unit 120) and obtained in real time. In an embodiment, the background image 201 may include data received from a server or another external electronic device through a communication unit (e.g., the communication unit 130). In an embodiment, the background image 201 may include data stored in a memory (e.g., the memory unit 140).

In an embodiment, the foreground image 202 may include data captured through a camera (e.g., the camera unit 120) and obtained in real time. In an embodiment, the foreground image 202 may include data received from a server or another external electronic device through a communication unit (e.g., the communication unit 130). In an embodiment, the foreground image 202 may include data stored in a memory (e.g., the memory unit 140).

The processor 200 according to an embodiment may extract the plurality of first frames 201-1, 201-2, . . . , 201-N and the plurality of second frames 202-1, 202-2, . . . , 202-N in chronological order.

The background image processor 210 according to an embodiment may include a light source estimator 212, a first filter unit 214, an illuminance estimator 216, a second filter unit 218, and a background light source information generator 219. The foreground image processor 220 according to an embodiment may include a light source estimator 222 and a first filter unit 224. Although omitted in FIG. 2 for convenience of description, the foreground image processor 220 may also include an illuminance estimator (not illustrated) for illuminance estimation and a second filter (not illustrated) for second filtering.

In an embodiment, the light source estimator 212 may estimate light source information for each frame for each of the first frames (e.g., 201-1, 201-2, 201-3, . . . , 201-N) extracted from the background image. For example, the light source estimator 212 may identify the RGB vector of the first frame 201-1. The RGB vector may be related to RGB information about the light source and may include an R value, a G value, and a B value as components.

In an embodiment, the light source estimator 212 may identify the R value, the G value, and the B value of all the pixels constituting the first frame (e.g., 201-1), and may estimate the light source vector by combining the largest R value, G value, and B value. Pixels having the largest R value, G value, and B value may not be the same pixel.

In an embodiment, the light source estimator 222 of the foreground image processor 220 may also perform an operation corresponding to the operation performed by the light source estimator 212 on the plurality of second frames (e.g., 202-1, 202-2, 202-3, . . . , 202-N).

In an embodiment, the first filter unit 214 may receive the RGB vector of the first frame from the light source estimator 212 and may generate the background light source vector by applying the first filter to the RGB vector of the first frame. The first filter may be referred to as a "moving average calculation filter" and may refer to a filter for removing high-frequency noise (e.g., when there is an abrupt change in brightness only in a specific pixel, such as when the sun is shortly displayed only in a partial area of the frame) included only in a specific frame in an image including a plurality of frames. The first filter unit 214 may perform filtering on each of the R, G, and B components included in the RGB vector of the first frame (e.g., 201-1).

In an embodiment, the first filter unit 214 may identify an average of RGB vectors of a predetermined number (n) of first frames extracted before the first frame, and an average vector of the RGB vector of the first frame.

In an embodiment, the first filter unit 224 may perform filtering on the RGB vector of the second frame received from the light source estimator 222 using the first filter, and the filtering operation of the first filter unit 224 may correspond to the filtering operation of the first filter unit 214.

In an embodiment, the illuminance estimator 216 may estimate the illuminance value of the first frame. In an embodiment, the illuminance estimator 216 may identify illuminance values of all the pixels constituting the first frame and divide the illuminance values by the number of pixels to identify an average illuminance value, and may determine the identified average illuminance value as the illuminance value of the first frame. In an embodiment, although not illustrated in the drawings, the foreground image processor 220 may also include an illuminance estimator (not illustrated). However, the illuminance estimator included in the foreground image processor 220 may perform the average calculation only on the pixels in the background area other than the subject area.

In an embodiment, the second filter unit 218 may receive the illuminance value of the first frame from the illuminance estimator 216, and may apply the second filter to the received illuminance value of the first frame to generate a background illuminance value. The second filter may be referred to as a "waveriding filter" and may mean a filter for synthesizing an image by quickly reflecting an abrupt change occurring in a specific frame.

In an embodiment, although not illustrated in the drawings, the foreground image processor 220 may also include a second filter (not illustrated). When a value larger than the current average of the filter is input through the second filter, the current average value of the filter may be updated to a new instantaneous input value, and when a value smaller than the current average of the filter is input, the average of the filter may be moved toward the new input value. Through the second filter, the abrupt change in the input signal may be synchronized very quickly in real time, and the input signal may be smoothed.

The background light source information generator 219 according to an embodiment may generate background light source information based on a background light source vector and a background illuminance value. The background light source information may be determined based on the following equation.

$$BkgLight(n) = L(n)/\text{light source illuminance} * \text{Brightness}(n) \quad \text{[Equation 1]}$$

In Equation 1, BkgLight(n) may mean the component value of the background light source vector included in the light source information about the nth frame of the background image, L(n) may mean the component value of the background light source vector generated by filtering the RGB vector extracted from the nth frame of the background image through the first filter unit (e.g., the first filter unit 214), Brightness(n) may mean the background illuminance value generated by filtering the illuminance value of the nth frame of the background image through the second filter unit (e.g., the second filter unit 218), and the light source illuminance value may mean the illuminance value generated based on the L(n) value.

In an embodiment, BkgLight(n) may include BkgLightR(n), BkgLightG(n), and BkgLightB(n), and BkgLightR(n) may mean the R component value of BkgLight(n), BkgLightG(n) may mean the G component value of BkgLight(n), and BkgLightB(n) may mean the B component value of BkgLight(n).

In an embodiment, L(n) may include LR(n), LG(n), and LB(n), and LR(n) may mean the R component of L(n), LG(n) may mean the G component value of L(n), and LB(n) may mean the B component value of L(n).

In an embodiment, the light source illuminance value may be determined based on Equation 2 below.

$$\text{Light source illuminance} = 0.299 * LR(n) + 0.587 * LG(n) + 0.114 * LB(n) \quad \text{[Equation 2]}$$

In Equation 2, LR(n) may mean the R component value of L(n), LG(n) may mean the G component value of L(n), and LB(n) may mean the B component value of L(n).

The image blending processor 230 according to an embodiment may include a light source characteristic exchanger 232 and an image synthesizer 234. The light source characteristic exchanger 232 may also be referred to as a "virtual light source strength/weakness adjuster".

In an embodiment, the image blending processor 230 may synthesize the first frame extracted from the background image and the second frame extracted from the foreground image.

In an embodiment, the light source characteristic exchanger 232 may generate the composite light source information about the composite image, based on the background light source information received from the background image processor 210 and the foreground light source information received from the foreground image processor 220. The composite light source information may refer to information in which light source characteristics of the composite image are modified based on background light source information.

In an embodiment, the image synthesizer 234 may generate a composite image based on the composite light source information, the foreground image information, and the background image information. In an embodiment, the composite image generated through the image synthesizer 234 may include a plurality of third frames 203 (e.g., 203-1, 203-2, 203-3, . . . , **203-*n***).

In the following description, it is described that the electronic device synthesizes the foreground image and the background image based on the light source characteristics and the illuminance characteristics of the background image, but the scope of the disclosure is not limited thereto. In other words, embodiments of the disclosure may be applied even when the foreground image and the background image are synthesized based on the light source characteristic and the illuminance characteristic of the foreground image.

Figure 3:
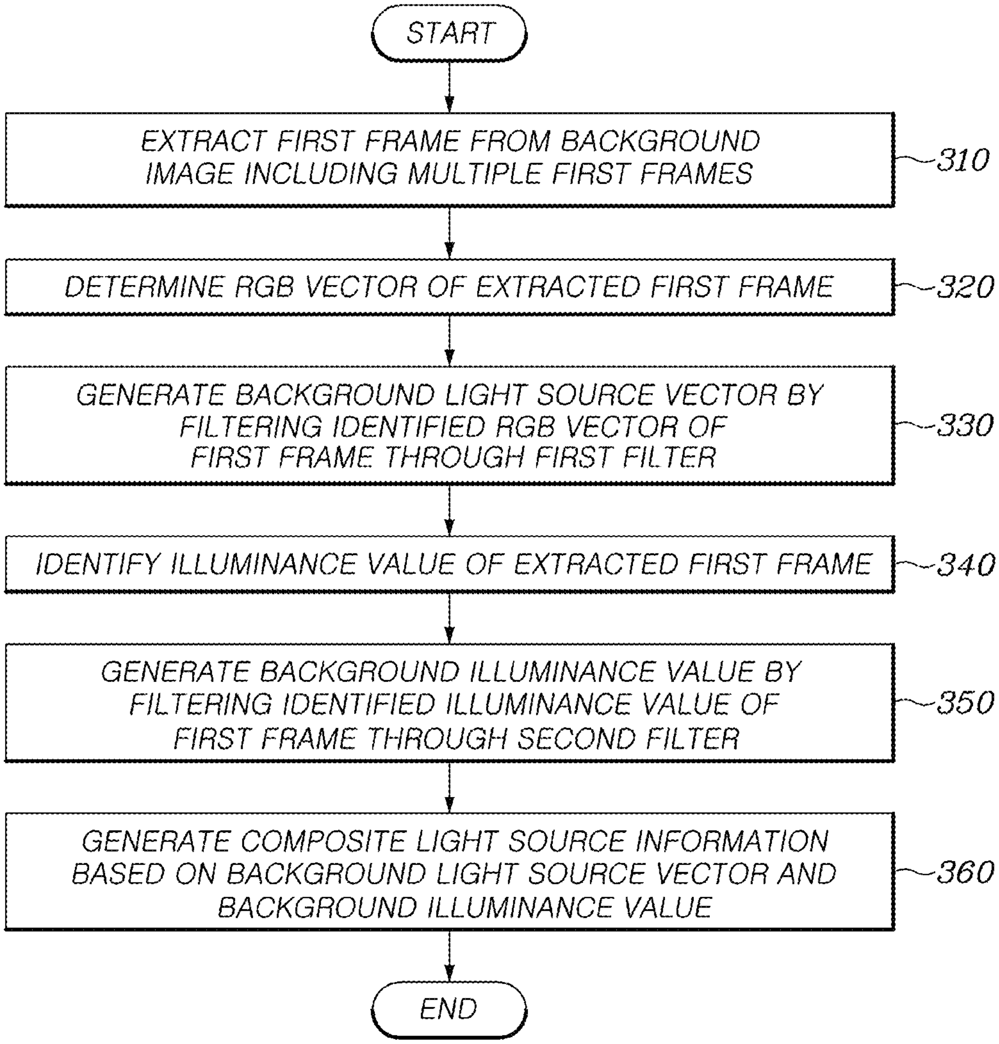
FIG. 3 illustrates an operation flow of an electronic device according to an embodiment.

FIG. 3 illustrates an operation flow of an electronic device according to an embodiment. The electronic device of FIG. 3 may mean the electronic device 100 of FIG. 1.

According to an embodiment, in operation 310, the electronic device may extract the first frame from the background image including the plurality of first frames. The first frame may refer to a frame constituting the background image, and the second frame may refer to a frame constituting the foreground image. The background image may include a plurality of first frames, and the foreground image may include a plurality of second frames.

In an embodiment, the electronic device may obtain the foreground image and the background image through a camera (e.g., the camera unit 120), a communication unit (e.g., the communication unit 130), or a memory (e.g., the memory unit 140). For example, an electronic device for providing a live streaming service or a video conference may obtain the foreground image by capturing the user performing real-time broadcasting through the camera included in the electronic device and obtain the background image from data stored in the memory of the electronic device. Further, e.g., a self-luminous artwork display device used in an exhibition, an art museum, a museum, or the like may obtain a foreground image by obtaining image data of the artwork to be displayed from the memory, and obtain a background image through the camera included in the electronic device. Further, an electronic device for providing a service based on signage or virtual background technology may obtain a background image and a foreground image through the communication unit.

In an embodiment, the electronic device may sequentially extract frames from the background image including a plurality of first frames over time. For example, when the background image includes n frames, the electronic device may sequentially extract the first frame 201-1, the first frame 201-2, . . . , and the first frame **201-*n* from the background image. In the following description, the first frame extracted by the electronic device from among the plurality of first frames may mean any one of the first frame 201-1, the first frame 201-2, . . . , and the first frame 201-*n***.

According to an embodiment, in operation 320, the electronic device may determine the RGB vector of the extracted first frame. The RGB vector may refer to an RGB vector indicating optical characteristics of the light source of the extracted first frame.

In an embodiment, the electronic device may identify a maximum value for each of an R component, a G component, and a B component of all the pixels constituting the extracted first frame. The electronic device may identify an RGB vector including the maximum value of the R component, the maximum value of the G component, and the maximum value of the B component as components. The RGB vector of the extracted first frame may have a form of a vector [R, G, B] composed of three scalar values.

In an embodiment, the electronic device may identify the RGB vector of the first frame as shown in Table 1 below.

TABLE 1

```
RGB calcPeakRGB(tiff_image* img, int row, int col, int height, int
width)
{
  int rows = 2160;
  int cols = 3840;
  int n, rn, cn;
  unsigned short r, g, b;
  RGB max;
  max.R = max.G = max.B = 0.0;
  for (rn = row, rn < row + height; rn++) {
    for (cn = col; cn < col + width; cn++) {
      img->moveTo(rn, cn);
      r = img->cb.rgb.R;
      g = img->cb.rgb.G;
      b = img->cb.rgb.B;
      if (r > max.R) {
        max.R = r;
      }
      if (g > max.G) {
        max.G = g;
```

TABLE 1-continued

```
      }
      if (b > max.B) {
        max.B = b;
      }
    }
  }
  return max;
```

Table 1 is implemented as an image having a horizontal size of 3840 pixels and a vertical size of 2160 pixels as an example, but this is merely an example, and corresponding operations may also be performed on a frame having a different size.

Referring to Table 1, the light source estimator 212 and the light source estimator 222 may identify the maximum value of each of R, G, and B components for all the pixels constituting the frame. The R, G, and B components having the maximum value do not necessarily have to be the same pixel, and the RGB vector of the first frame may have a form of a vector [R, G, B] composed of three scalar values.

According to an embodiment, in operation 330, the electronic device may filter the RGB vector of the identified first frame through the first filter to generate a background light source vector. The background light source vector may refer to a vector obtained by applying the first filter to the RGB vector of the identified first frame. The first filter may refer to a filter for performing moving average filtering, and may be performed through a meantrace operation.

In an embodiment, the electronic device may perform filtering through the first filter for each component (R component value, G component value, B component value) included in the RGB vector of the first frame. For example, each of the R value, the G value, and the B value constituting the RGB vector of the first frame may be filtered through the first filter.

In an embodiment, the electronic device may output an average of the RGB vectors of a predetermined number (n) of other first frames extracted before the first frame, and an average value of the RGB vector of the first frame.

According to an embodiment, in operation 340, the electronic device may identify the illuminance value of the extracted first frame.

In an embodiment, the electronic device may identify illuminance values of all the pixels included in the extracted first frame, and then may calculate an average value thereof to determine the illuminance value of the first frame.

According to an embodiment, in operation 350, the electronic device may filter the identified illuminance value of the first frame through the second filter to generate a background illuminance value. The background illuminance value may refer to an illuminance value to be output by the electronic device as background light source information. The second filter may also be referred to as a "waveriding filter". The second filter may refer to a filter for outputting an input illuminance value rather than the average value when a frame having an illuminance larger than or equal to the average value is identified, in order to solve the problem of not being able to quickly keep up with a change in brightness (e.g., an abrupt change in brightness due to flashing) occurring in a specific frame due to calculation of the moving average.

In an embodiment, the electronic device may generate a background illuminance value by comparing the identified illuminance value of the first frame with an average value of illuminance values of a predetermined number (m) of other first frames extracted before the first frame. For example, when the identified illuminance value of the first frame is larger than the average value of illuminance values of the predetermined number (m) of other first frames extracted before the first frame, the electronic device may determine the illuminance value of the first frame as the background illuminance value of the first frame. Further, e.g., when the identified illuminance value of the first frame is smaller than the average value of illuminance values of the predetermined number (m) of other first frames extracted before the first frame, the electronic device may determine the average value of the identified illuminance value of the first frame and the average value of illuminance values of the predetermined number (m−1) of other first frames as the background illuminance value of the first frame.

According to an embodiment, in operation 360, the electronic device may generate composite light source information based on the background light source vector and the background illuminance value.

In an embodiment, the electronic device may generate composite light source information based on the background light source vector and the background illuminance value generated in operation 330, and may generate a composite image by synthesizing the composite light source information, the foreground image data, and the background image data.

In an embodiment, the electronic device may synthesize the first frame extracted from the background image and the second frame extracted from the foreground image. In an embodiment, the electronic device may generate a foreground light source vector and a foreground illuminance value by performing operations corresponding to operations 310, 320, and 330 of FIG. 3 on the second frame extracted from the foreground image. The electronic device may generate a composite image based on the generated foreground light source vector, foreground illuminance value, and composite light source information.

In an embodiment, the electronic device may identify the subject and the background area included in the foreground image, and may remove the background area other than the subject. The electronic device may identify an RGB vector and an illuminance value for the background area-removed second frame.

In an embodiment, the electronic device may perform linear transformation on all the pixels of the frame included in the foreground image, based on the background light source information, generating composite light source information.

In an embodiment, the operation in which the electronic device generates the composite light source information according to operation 360 may be performed based on Table 2 below.

TABLE 2

```
void mapColorTone(tiff_image* img. RGB myWhite, tiff_image*
target_img, RGB targetWhite) {
  int n;
  double r, g, b;
  double r1, g1, b1, r2, g2, b2;
  double scaleR, scaleG, scaleB;
  r1 = myWhite.R; g1 = myWhite.G; b1 = myWhite.B;
  r2 = targetWhite.R; g2 = targetWhite.G; b2 = targetWhite.B;
  scaleR = r2 / r1; scaleG = g2 / g1; scaleB = b2 / b1;
  RGB black = { 0, 0, 0 };
  target_img->resetAllPixels(black);
  for (n = 0; n < img->rows* img->cols; n++)
  {
    img->moveTo(n);
    target_img->moveTo(n);
```

TABLE 2-continued

```
    if (black == img->cb.rgb) {
      //do nothing!!
    }
    else {
      r = img->cb.rgb.R; g = img->cb.rgb.G; b = img->cb.rgb.B;
      r *= scaleR; g *= scaleG; b *= scaleB;
      target_img->cb.rgb.R = r;
      target_img->cb.rgb.G = g;
      target_img->cb.rgb.B = b;
    }
    target_img->commit( );
  }
  return;
}
```

Referring to Table 2, img may refer to the original foreground image, and target_img may refer to the space in which the composite image is to be stored. myWhite is the foreground light source vector, and targetWhite is the background light source vector. In an embodiment, in order to generate the composite light source information, the light source characteristic exchanger 232 may generate the composite light source information by performing linear transformation on all the pixels of the frame included in the foreground image, based on the background light source information.

$$RGB_{out}(x, y) = (targetWhite.RGB/myWhite.RGB) * RGB_{in}(x, y) \quad \text{[Equation 3]}$$

In Equation 3, $RGB_{out}$ (x, y) denotes the R, G, and B component values in the (x, y) pixel of the composite light source vector included in the output composite light source information, targetWhite.RGB denotes the R, G, and B component values in the (x, y) pixel of the background light source vector, myWhite.RGB denotes the R, G, and B component values in the (x, y) pixel of the foreground light source vector, and $RGB_{in}$ (x, y) denotes the R, G, and B values in the (x, y) pixel of the first frame.

Figure 4A:
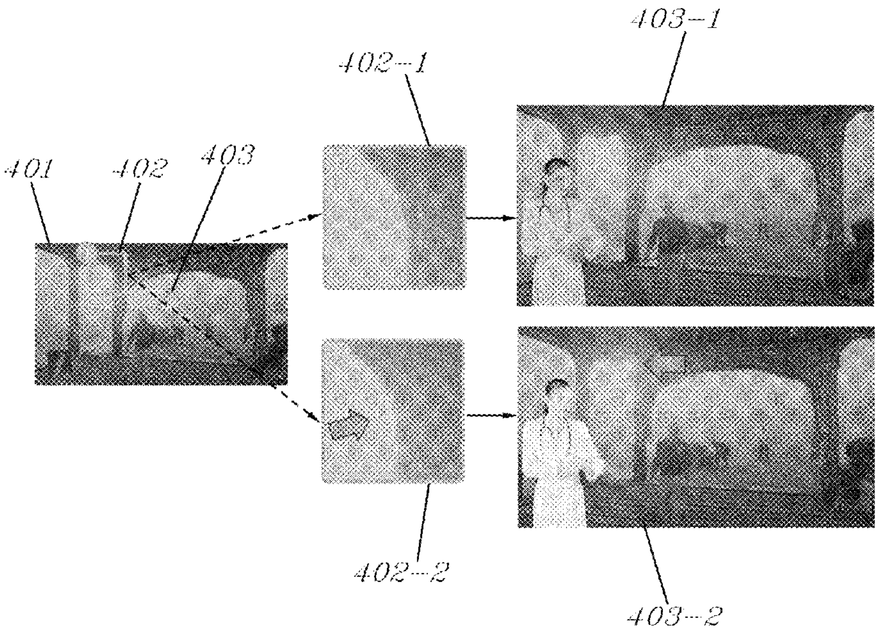
FIG. 4A illustrates an example of a composite image before applying a first filter according to an embodiment.

FIG. 4A illustrates an example of a composite image before applying a first filter according to an embodiment. The first filter refers to the first filter described in operation 330 of FIG. 3. When the first filter is not applied to generate the composite image, the brightness of the foreground image may also change excessively rapidly due to an abrupt change in brightness occurring in a specific area of the background image.

The background image 401 may include a specific area 402 and the remaining area 403. A 1-1th area 402-1 is an enlarged one of the area corresponding to the specific area 402 in the nth frame extracted from the background image 401. A 1-2th area 402-2 is an enlarged one of the area corresponding to the specific area 402 in a frame extracted after the nth frame in the background image 401. A 1-1th composite frame 403-1 represents a frame in which an nth frame extracted from the background image 401 and a frame of the foreground image are synthesized, and a 1-2th composite frame 403-2 represents a frame in which a frame extracted after the nth frame from the background image 401 and another frame of the foreground image are synthesized.

Referring to FIG. 4A, although not displayed in the 1-1th area 402-1, the brightness of some pixels may be rapidly brightened in the 1-2th area 402-2 (due to the instantaneous appearance of the sun). Since the light source of the composite image is changed based on the background light source, an abrupt change in brightness may occur in the 1-2th composite frame 403-2 as compared with the 1-1th composite frame 403-1. Accordingly, a sense of heterogeneity may occur due to an abrupt change in brightness in the composite image. As such, the electronic device according to an embodiment may apply the first filter in order to minimize a significant influence on the composite image due to a tiny change in brightness that does not significantly affect the entire image but appears only in some pixels.

Figure 4B:
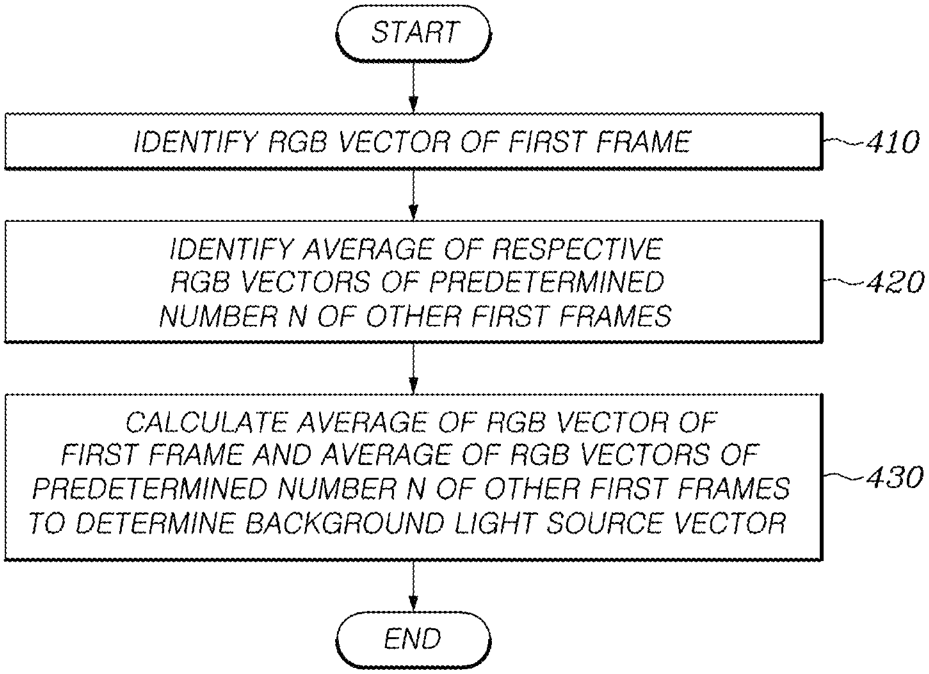
FIG. 4B illustrates a flow of a first filtering operation of an electronic device according to an embodiment.

FIG. 4B illustrates a filtering operation flow of an electronic device according to an embodiment. Referring to FIG. 4B, the electronic device may filter the RGB vector of the first frame through the first filter to generate a background light source vector. The operation illustrated in FIG. 4B may include operation 320 of FIG. 3.

According to an embodiment, in operation 410, the electronic device may identify the RGB vector of the first frame. For example, the electronic device may identify the R value, the G value, and the B value of the RGB vector of the first frame. The RGB vector of the first frame may mean the RGB vector of the first frame determined in operation 320.

According to an embodiment, in operation 420, the electronic device may identify an average of the respective RGB vectors of a predetermined number (n) of other first frames. For example, when the extracted first frame is the 50th frame in the background image including 100 frames and the predetermined number (n) is 9, the electronic device may identify an average value of the respective RGB vectors of the 41st frame, the 42nd frame, and the . . . 49th frame.

In an embodiment, the electronic device may determine the predetermined number considering the characteristics of the background image. For example, when it is determined that a plurality of high-frequency noises are included in the background image, the electronic device may determine a number having a number of n or more as the predetermined number. In an embodiment, the electronic device may determine the predetermined number based on a user input.

According to an embodiment, in operation 430, the electronic device may determine the background light source vector by calculating an average between the RGB vector of the first frame and an average of the RGB vectors of the predetermined number (n) of other first frames.

In an embodiment, when the predetermined number is 9, the average RGB vector corresponding to the average of the RGB vectors of the nine other first frames is (a, b, c), and the RGB vector identified in the first frame is (a', b', c'), the electronic device may determine ((9a+a')/10), ((9b+b')/10), (9c+c')/10)) as the background light source vector. It is possible to minimize an abrupt change in the light source of the composite image by using the background light source vector where moving average operation has been performed, rather than using the RGB vector of the extracted first frame directly as the background light source vector.

In an embodiment, the operation flow of the electronic device shown in FIG. 4B may be implemented as shown in Table 3.

TABLE 3

```
struct colorMeanTrace {
  meanTrace R;
  meanTrace G;
  meanTrace B;
  colorMeanTrace(int buffSize) {
    R.init(buffSize);
    G.init(buffSize);
    B.init(buffSize);
  };
  void add(RGB color) {
```

TABLE 3-continued

```
    R.add(color.R);
    G.add(color.G);
    B.add(color.B);
  };
  RGB getMean(void) {
    RGB ret;
    ret.R = R.getMean( );
    ret.G = G.getMean( );
    ret.B = B.getMean( );
    return ret;
  };
};
```

Referring to Table 3, in an embodiment, the electronic device may determine a predetermined number (buffSize) when (init) or before performing filtering on the first, first frame using the first filter.

In an embodiment, the electronic device may sequentially fill each component value of the RGB vector in a predetermined number (buffSize) of real number-type buffers for each of the extracted frames.

In an embodiment, the electronic device may perform an averaging operation (getMean) on each component value of RGB vectors included in the buffer and a value of a newly input RGB vector. Accordingly, the average of all the values contained in the buffer may be calculated and output.

In an embodiment, when the initial add function is called when the buffer is empty during initial filtering, the electronic device may set all the er values as factor values given to the add function. Accordingly, the initially given value may be implemented to have a relatively large influence on the average value at a ratio of (bufferSize−1)/(bufferSize): 1/(bufferSize) for the next given value.

In an embodiment, the first filter (moving average filter) may mean n buffers and averaging thereof. For example, when n is 10 and a value initially input to the first filter is 123, an output value of the first filter may be determined as 123. This is because when 123 first enters as the input, all of the 10 buffers are set to 123, and the output of the moving average calculator is 123*10/10. Further, e.g., if the second input value is 113, the output value of the first filter may be determined as 122. This is because there are nine 123's, and one 113, so if the operation of (123*9+113)/10 is performed, it becomes 122.

The filtering operation through the first filter performs smoothing of fluctuations present in a sequence of signals (e.g., RGB vectors indicating the color of the light source) input to the filter without any special conditions. The first filter may receive lighting characteristic values R, G, and B (e.g., RGB vectors of the first frame) calculated through the MaxRGB algorithm (e.g., operation 320) in each frame.

Figure 5A:
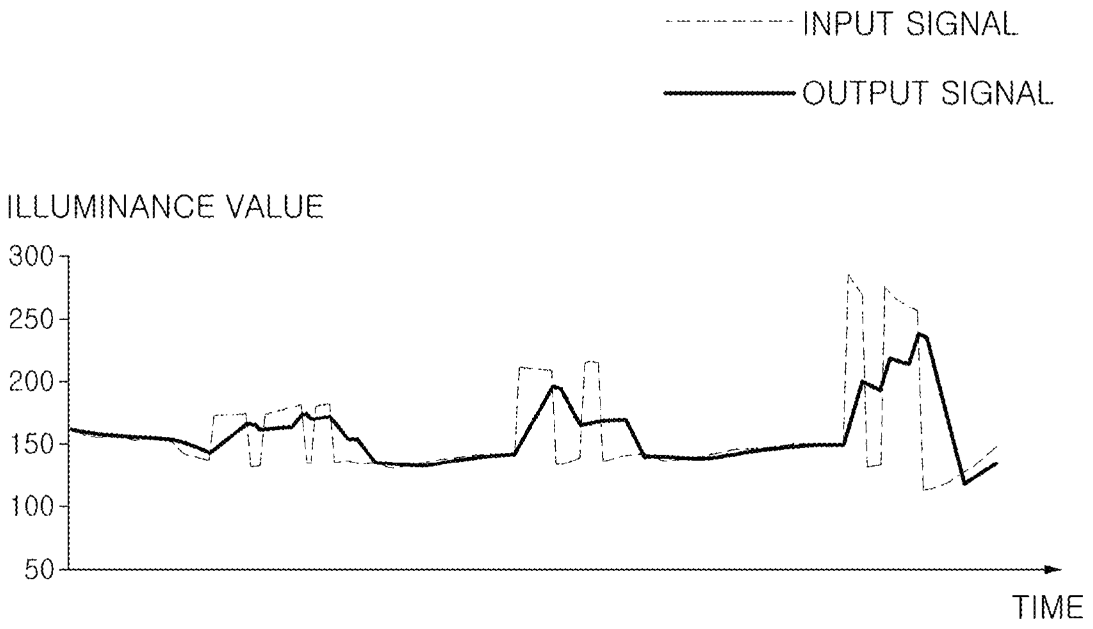
FIG. 5A illustrates an example of an input signal and an output signal according to application of a first filter of an electronic device according to an embodiment.

FIG. 5A illustrates an example of an input signal and an output signal according to application of a first filter of an electronic device according to an embodiment.

FIG. 5A illustrates an example of an input signal and an output signal according to application of a first filter of an electronic device according to an embodiment. The graph shown in FIG. 5A shows input and output signals before filtering is performed through the second filter according to operation 350 of FIG. 3. The input signal may indicate the illuminance value of the currently extracted frame. The output signal may indicate the illuminance value of the frame output by applying the first filter to the currently extracted frame.

Referring to FIG. 5A, since the electronic device generates the background light source vector using the first filter regarding moving average calculation, rather than using the RGB vector of the extracted frame, the electronic device may not quickly reflect an abrupt change in brightness (e.g., flashing) that may occur throughout the background image. For example, referring to FIG. 5A, it may be identified that the illuminance value of the output signal increases with a time difference even though the illuminance value of the input signal increases rapidly. Further, e.g., it may be identified that the illuminance value of the output signal rises after the illuminance value of the input signal rises sharply and then returns to its original state. As described above, when the moving average calculation of the first filter is used, a slight change in brightness due to a specific pixel may be smoothed, but a time may be required to reflect the abrupt change in the illuminance value.

Figure 5B:
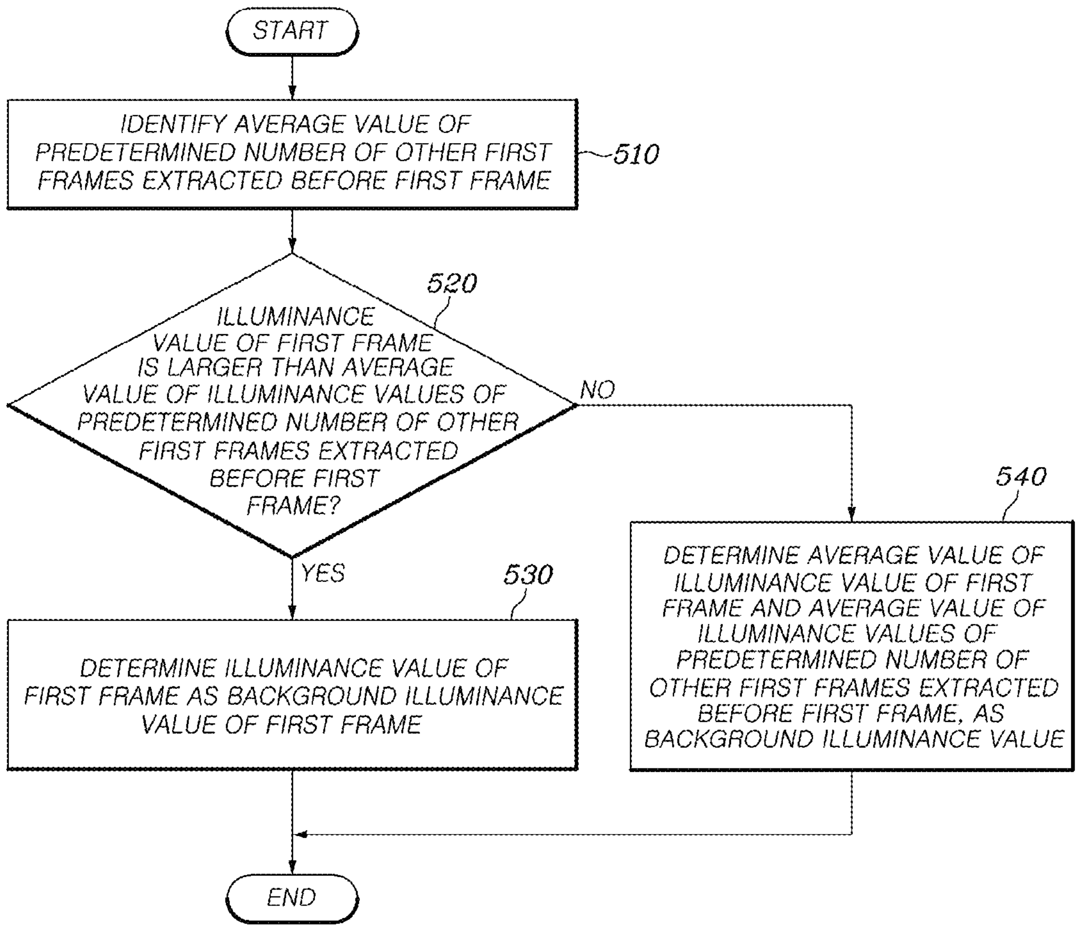
FIG. 5B illustrates a flow of a second filtering operation of an electronic device according to an embodiment.

FIG. 5B illustrates a flow of a second filtering operation of an electronic device according to an embodiment. Referring to FIG. 5B, the electronic device may generate a background illuminance value by filtering the illuminance value of the first frame through the second filter. The operation illustrated in FIG. 5B may include operation 350 of FIG. 3.

According to an embodiment, in operation 510, the electronic device may identify an average value of illuminance values of a predetermined number of other first frames extracted before the first frame.

In an embodiment, the operation in which the electronic device identifies the average value of illuminance values of the predetermined number of other first frames extracted before the first frame may be an operation corresponding to operation 420 of FIG. 4B.

According to an embodiment, in operation 520, the electronic device may determine whether the illuminance value of the first frame is larger than the average value of illuminance values of the predetermined number of other first frames extracted before the first frame.

In an embodiment, the electronic device may identify a difference (diff) between the illuminance value of the first frame and the average value of illuminance values of the predetermined number of other first frames extracted before the first frame. In an embodiment, when the difference has a value larger than 0, the electronic device may determine that the illuminance value of the first frame is larger than the average value of illuminance values of the predetermined number of other first frames extracted before the first frame. In an embodiment, when the difference has a value smaller than 0, the electronic device may determine that the illuminance value of the first frame is smaller than the average value of illuminance values of the predetermined number of other first frames extracted before the first frame.

According to an embodiment, when the electronic device determines in operation 520 that the illuminance value of the first frame is larger than an average value of illuminance values of a predetermined number of other first frames extracted before the first frame, in operation 530, the electronic device may determine the illuminance value of the first frame as a background illuminance value of the first frame.

According to an embodiment, when the electronic device determines in operation 520 that the illuminance value of the first frame is smaller than the average value of the illuminance values of the predetermined number of other first frames extracted before the first frame, in operation 540, the electronic device may determine the average value of the illuminance value of the first frame and the average value of the illuminance values of the predetermined number of other first frames extracted before the first frame as the background illuminance value.

In an embodiment, the second filtering operation of the electronic device shown in FIG. 5B may be implemented as shown in Table 4 below.

TABLE 4

```
struct waveRidingFilter {
  double luma[1024];
  int szBuffer, pos;
  double szStep;
  void init(int count, double stepSize) {
    szBuffer = count;
    szStep = stepSize;
    if (stepSize <= 0.0) {
      szStep = 1.0;
    }
    pos = 0;
  };
  void set(double v) {
    for (int n = 0; n < szBuffer; n++) {
      luma[n] = v;
    }
    pos = 0;
  };
  void update(double v) {
    luma[pos++] = v;
    if (pos == szBuffer) {
      pos = 0;
    }
  };
  double getMean(void) {
    double ret = 0.0;
    for (int n = 0; n < szBuffer; n++) {
      ret += luma[n];
    }
    return ret / szBuffer;
  };
  int add(double v) {
    double mean = getMean( );
    double diff;
    int n, repeatCount;
    diff = v - mean;
    if (diff >= 0) {
      set(v);
      return -1;
    }
    else {
      repeatCount = (-diff) / szStep;
    }
    for (n = 0; n < repeatCount; n++) {
      update(v);
    }
    return repeatCount;
  };
};
```

Referring to Table 4, the electronic device according to an embodiment may determine the buffersize, i.e., the predetermined number, of the second filter when performing an initialization operation. In an embodiment, the electronic device may set all values of the buffer as one value when initializing through a set function. In other words, when the second filter is applied to the illuminance value of the first frame extracted for the first time, the electronic device may set the illuminance values included in the buffers as the illuminance value of the first frame extracted for the first time through the set function.

In an embodiment, the electronic device may update the illuminance value of the extracted first frame. The update function is a function that adds one value to the buffer in a state in which several pieces of information are in the buffer.

In an embodiment, the electronic device may identify an average value of illuminance values of a predetermined umber of first frames extracted first and an average value of illuminance values of the first frame. This may be performed through the getMean function, and the getMean function may calculate and output an average value of values included in the buffer and an input illuminance value.

In an embodiment, the electronic device may determine whether the illuminance value of the first frame is larger than the average value of illuminance values of the plurality of other first frames extracted before the first frame. For example, the electronic device may determine whether a new input value, i.e., the illuminance value v of the currently identified first frame, is larger than the average value of illuminance values of other first frames first extracted in the current buffer. If an input value (v) is given, the electronic device may compare the corresponding new input value with the average of the current second filter through the add function.

In an embodiment, when the illuminance value of the first frame is larger than the average value of illuminance values of the plurality of other first frames extracted before the first frame, the electronic device may output the illuminance value of the first frame. For example, referring to Table 4, when the new input is larger than the moving average included in the filter, the set function may be executed to output the new input value. As described above, the set function may forcibly set all of the values of the buffer as one value for an instant as described above, and thus, if a value slightly larger than the moving average managed by the filter is input, the average of the filter may be updated to the latest value.

In an embodiment, when the illuminance value of the first frame is smaller than the average value of the illuminance values of the plurality of other first frames extracted before the first frame, the electronic device may output the average value of the illuminance values of the plurality of other first frames extracted before the predetermined number of first frames and the illuminance value of the first frame. For example, referring to Table 4, the repeatCount value is calculated as a value proportional to the difference between the moving average and v, and referring to the for loop function immediately below, it may be identified that the update function is configured to be called repeatCount times. The update function may update one of the N filter coefficients to the latest input value. Therefore, calling the update (v) function once may mean allowing the moving average of the filter to approach the latest input value v with an intensity of 1. Calling the update(v) function n times may mean allowing the moving average of the filter to approach the latest input value with an intensity of n times. In other words, in updating the filter value when the latest input value v is smaller than the moving average of the filter, it is possible to allow the new average of the filter value to approach the latest input value more strongly as the difference between the moving average and the latest input value increases and weakly adjust allowing the moving average of the filter to approach the latest input when the difference in magnitude between the moving average of the filter and the latest input signal is small.

In an embodiment, the electronic device may determine whether the illuminance value of the first frame is larger than the average value of illuminance values of the plurality of other first frames extracted before the first frame. In Table 4, since an image based on 10 bits is described as an example, the range of illuminance values is limited to real numbers having a range of 0 to 1023, but this is merely an example, and illuminance values may have different ranges depending on the designing method.

Figure 5C:
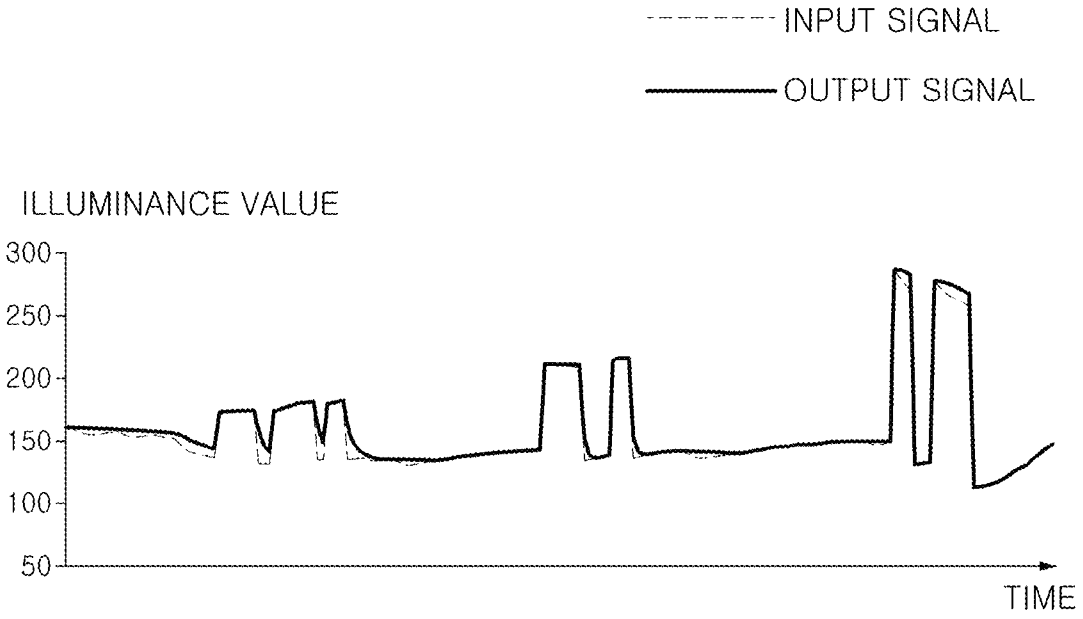
FIG. 5C illustrates an example of an input and output signal according to application of a first filter and a second filter of an electronic device according to an embodiment.

FIG. 5C illustrates an example of an input signal and an output signal of an electronic device according to an embodiment. Referring to FIG. 5C, the input signal may correspond to the illuminance value of the first frame described in operation 340, and the output signal may mean the background illuminance value determined in operation 350.

Referring to FIG. 5C, it may be identified that the value of the input signal is always lower than the value of the output signal. The input signal and the output signal illustrated in FIG. 5C may be graphically illustrated in FIG. 5B.

In an embodiment, the electronic device may determine whether the illuminance value of the first frame is larger than or smaller than the average value of the illuminance values of the predetermined number of other first frames extracted before the first frame, based on whether the difference (diff) between the illuminance value of the first frame and the average value of the illuminance values of the predetermined number of other first frames extracted before the first frame has a value larger than or smaller than 0.

In an embodiment, when it is determined that the illuminance value of the first frame is larger than the average value of the illuminance values of the predetermined number of other first frames extracted before the first frame, the electronic device may determine and output the illuminance value of the first frame as the background illuminance value of the first frame and, when it is determined that the illuminance value of the first frame is smaller than the average value of the illuminance values of the predetermined number of other first frames extracted before the first frame, the electronic device may determine and output the average of the illuminance value of the first frame and the illuminance values of the predetermined number of other first frames extracted before the first frame as the background illuminance value. As a result, it may be identified that the input signal always has a lower illuminance value than the output signal.

An electronic device according to an embodiment of the disclosure may comprise a memory, a camera, a communication unit, and at least one processor electrically connected to the memory, the camera, and the communication unit. The at least one processor may extract a first frame from a first image including a plurality of first frames, identify an RGB vector of the first frame, determine a first light source vector by filtering the RGB vector of the first frame through a first filter, identify an illuminance value of the first frame, determine a first illuminance value by filtering the illuminance value of the first frame through a second filter, and generate composite light source information based on the first light source vector and the first illuminance value.

In an embodiment, the at least one processor may determine a vector corresponding to an average of the RGB vector of the first frame and an average of RGB vectors of a predetermined number of other first frames extracted before the first frame among the plurality of first frames, as the first light source vector.

In an embodiment, the at least one processor may, when the illuminance value of the first frame is larger than an average of illuminance values of a predetermined number of other first frames extracted before the first frame among the plurality of first frames, determine that the illuminance value of the first frame as the first illuminance value, and when the illuminance value of the first frame is smaller than the average of the illuminance values of the predetermined number of other first frames extracted before the first frame among the plurality of first frames, determine an average of the illuminance value of the first frame and the average of the illuminance values of the predetermined number of other first frames extracted before the first frame among the plurality of first frames, as the first illuminance value.

In an embodiment, the at least one processor may, when the illuminance value of the first frame is larger than the average of the illuminance values of the predetermined number of other first frames extracted before the first frame among the plurality of first frames, determine the illuminance value of the first frame as the average of the illuminance values of the predetermined number of other first frames extracted before the first frame.

In an embodiment, the at least one processor may determine a first light source illuminance value based on the first light source vector and generate the composite light source information based on the first light source illuminance value, the first illuminance value, and the first light source vector.

In an embodiment, the at least one processor may identify a second frame corresponding to the first frame among a plurality of frames included in a second image, identify an RGB vector of the second frame, generate a second light source vector by filtering the RGB vector of the second frame through the first filter, and synthesize the first frame and the second frame based on the composite light source information and the second light source vector.

In an embodiment, the at least one processor may obtain, in real time, the second image through the camera or the communication unit, and obtain the first image from the memory.

In an embodiment, the at least one processor may obtain the second image from the memory, and obtain, in real time, the first image through the camera or the communication unit.

In an embodiment, the at least one processor may identify a subject and a background area included in the second image, and extract the second frame by removing the background area from the second image.

In an embodiment, the at least one processor may identify an R value, a G value, and a B value of all pixels included in the first frame, identify a maximum value for each of the R value, the G value, and the B value of all the pixels included in the first frame, and identify the RGB vector of the first frame by combining the R value, the G value, and the B value having the maximum value.

In an embodiment, the at least one processor may identify an illuminance value of the second frame, obtains a second illuminance value by filtering the illuminance value of the second frame through the second filter, generate composite light source information different from the composite light source information based on the second light source vector and the second illuminance value, and synthesize the first frame and the second frame based on the different composite light source information and the first light source vector.

In an embodiment, the at least one processor may store the composite light source information, in a form of metadata, in the memory, obtain a second image obtained through the camera or the communication unit, and generate a composite image based on the second image and the metadata.

A method for operating an electronic device, according to an embodiment of the disclosure, may comprise extracting a first frame from a first image including a plurality of first frames, identifying an RGB vector of the first frame, determining a first light source vector by filtering the RGB vector of the first frame through a first filter, identifying an illuminance value of the first frame, determining a first illuminance value by filtering the illuminance value of the first frame through a second filter, and generating composite light source information based on the first light source vector and the first illuminance value.

In an embodiment, determining the first light source vector by filtering the RGB vector of the first frame through the first filter may include determining a vector corresponding to an average of the RGB vector of the first frame and an average of RGB vectors of a predetermined number of other first frames extracted before the first frame among the plurality of first frames, as the first light source vector.

In an embodiment, determining the first illuminance value by filtering the illuminance value of the first frame through the second filter may include, when the illuminance value of the first frame is larger than an average of illuminance values of a predetermined number of other first frames extracted before the first frame among the plurality of first frames, determining that the illuminance value of the first frame as the first illuminance value and, when the illuminance value of the first frame is smaller than the average of the illuminance values of the predetermined number of other first frames extracted before the first frame among the plurality of first frames, determining an average of the illuminance value of the first frame and the average of the illuminance values of the predetermined number of other first frames extracted before the first frame among the plurality of first frames, as the first illuminance value.

In an embodiment, when the illuminance value of the first frame is larger than the average of the illuminance values of the predetermined number of other first frames extracted before the first frame among the plurality of first frames, the illuminance value of the first frame may be determined as the average of the illuminance values of the predetermined number of other first frames extracted before the first frame.

In an embodiment, the method may further comprise determining a first light source illuminance value based on the first light source vector and generating the composite light source information based on the first light source illuminance value, the first illuminance value, and the first light source vector.

In an embodiment, the method may further comprise extracting a second frame corresponding to the first frame among a plurality of frames included in a second image, identifying an RGB vector of the second frame, generating a second light source vector by filtering the RGB vector of the second frame through the first filter, and synthesizing the first frame and the second frame based on the composite light source information and the second light source vector.

In an embodiment, the method may further comprise obtaining, in real time, the second image through a camera or a communication unit included in the electronic device and obtaining the first image from the memory of the electronic device.

In an embodiment, the method may further comprise obtaining the second image from the memory and obtaining, in real time, the first image through the camera or the communication unit.

The invention claimed is:

1. An electronic device, comprising:

a memory;

a camera;

a communication unit; and at least one processor electrically connectable to the memory, the camera, and the communication unit, wherein the at least one processor:

extracts a frame from an image including a plurality of frames;

identifies an RGB vector of the frame;

determines a light source vector by filtering the RGB vector of the frame through a first filter;

identifies an illuminance value of the frame;

determines an illuminance value in relation to a composite image by filtering the illuminance value of the frame through a second filter; and generates composite light source information based on the light source vector and the illuminance value in relation to the composite image.

2. The electronic device of claim 1, wherein the at least one processor determines a vector corresponding to an average of the RGB vector of the frame and an average of RGB vectors of a predetermined number of other frames extracted before the frame among the plurality of frames, as the light source vector.

3. The electronic device of claim 1, wherein the at least one processor:

based on the illuminance value of the frame being larger than an average of illuminance values of a predetermined number of other frames extracted before the frame among the plurality of frames, determines that the illuminance value of the frame as the illuminance value in relation to the composite image; and based on the illuminance value of the frame being smaller than the average of the illuminance values of the predetermined number of other frames extracted before the frame among the plurality of frames, determines an average of the illuminance value of the frame and the average of the illuminance values of the predetermined number of other frames extracted before the frame among the plurality of frames, as the illuminance value in relation to the composite image.

4. The electronic device of claim 3, wherein the at least one processor, based on the illuminance value of the frame being larger than the average of the illuminance values of the predetermined number of other frames extracted before the frame among the plurality of frames, determines the illuminance value of the frame as the average of the illuminance values of the predetermined number of other frames extracted before the frame.

5. The electronic device of claim 1, wherein the at least one processor:

determines a light source illuminance value based on the light source vector; and generates the composite light source information based on the light source illuminance value, the illuminance value in relation to the composite image, and the light source vector.

6. The electronic device of claim 5, wherein the light source vector is a first light source vector, the image is a first image, the frame is a first frame and the at least one processor:

extracts a second frame corresponding to the first frame among a plurality of frames included in a second image;

identifies an RGB vector of the second frame;

generates a second light source vector by filtering the RGB vector of the second frame through the first filter; and synthesizes the first frame and the second frame based on the composite light source information and the second light source vector.

7. The electronic device of claim 6, wherein the at least one processor:

obtains, in real time, the second image through the camera or the communication unit; and obtains the first image from the memory.

8. The electronic device of claim 6, wherein the at least one processor:

obtains the second image from the memory; and obtains, in real time, the first image through the camera or the communication unit.

9. The electronic device of claim 6, wherein the at least one processor:

identifies a subject and a background area included in the second image; and extracts the second frame by removing the background area from the second image.

10. The electronic device of claim 6, wherein the illuminance value in relation to the composite image is a first illuminance value, the composite light source information is a first composite light source information and the at least one processor:

identifies an illuminance value of the second frame;

obtains a second illuminance value by filtering the illuminance value of the second frame through the second filter;

generates a second composite light source information different from the first composite light source information based on the second light source vector and the second illuminance value; and synthesizes the first frame and the second frame based on the second composite light source information and the first light source vector.

11. The electronic device of claim 1, wherein the at least one processor:

identifies an R value, a G value, and a B value of all pixels included in the frame;

identifies a maximum value for each of the R value, the G value, and the B value of all the pixels included in the frame; and identifies the RGB vector of the frame by combining the R value, the G value, and the B value having the maximum value.

12. The electronic device of claim 1, wherein the at least one processor:

stores the composite light source information, in a form of metadata, in the memory;

obtains a second image obtained through the camera or the communication unit; and generates a composite image based on the second image and the metadata.

13. A method for operating an electronic device, the method comprising:

extracting a frame from an image including a plurality of frames;

identifying an RGB vector of the frame;

determining a light source vector by filtering the RGB vector of the frame through a first filter;

identifying an illuminance value of the frame;

determining an illuminance value in relation to a composite image by filtering the illuminance value of the frame through a second filter; and generating composite light source information based on the light source vector and the illuminance value in relation to the composite image.

14. The method of claim 13, wherein determining the light source vector by filtering the RGB vector of the frame through the first filter includes determining a vector corresponding to an average of the RGB vector of the frame and an average of RGB vectors of a predetermined number of other frames extracted before the frame among the plurality of frames, as the light source vector.

15. The method of claim 13, wherein determining the illuminance value by filtering the illuminance value of the frame through the second filter includes:

based on the illuminance value of the frame being larger than an average of illuminance values of a predetermined number of other frames extracted before the frame among the plurality of frames, determining that the illuminance value of the frame as the illuminance value in relation to the composite image; and based on the illuminance value of the frame being smaller than the average of the illuminance values of the predetermined number of other frames extracted before the frame among the plurality of frames, determining an average of the illuminance value of the frame and the average of the illuminance values of the predetermined number of other frames extracted before the frame among the plurality of frames, as the illuminance value in relation to the composite image.

16. One or more non-transitory computer-readable storage media storing one or more computer programs including computer-executable instructions that, when executed by one or more processors of an electronic device individually or collectively, cause the electronic device to perform operations, the operations comprising:

extracting a frame from an image including a plurality of frames;

identifying an RGB vector of the frame;

determining a light source vector by filtering the RGB vector of the frame through a first filter;

identifying an illuminance value of the frame;

determining an illuminance value in relation to a composite image by filtering the illuminance value of the frame through a second filter; and generating composite light source information based on the light source vector and the illuminance value in relation to the composite image.

17. The one or more non-transitory computer-readable storage media of claim 16, wherein the determining the light source vector by filtering the RGB vector of the frame through the first filter includes: determining a vector corresponding to an average of the RGB vector of the frame and an average of RGB vectors of a predetermined number of other frames extracted before the frame among the plurality of frames, as the light source vector.

18. The one or more non-transitory computer-readable storage media of claim 16, the operations further comprising:

determining a light source illuminance value based on the light source vector; and generating the composite light source information based on the light source illuminance value, the illuminance value in relation to the composite image, and the light source vector.

19. The one or more non-transitory computer-readable storage media of claim 18, wherein the light source vector is a first light source vector, the image is a first image, the frame is a first frame and the operations further comprising:

extracting a second frame corresponding to the first frame among a plurality of frames included in a second image;

identifying an RGB vector of the second frame;

generating a second light source vector by filtering the RGB vector of the second frame through the first filter; and synthesizing the first frame and the second frame based on the composite light source information and the second light source vector.

20. The one or more non-transitory computer-readable storage media of claim 19, the operations further comprising:

identifying a subject and a background area included in the second image; and extracting the second frame by removing the background area from the second image.

* * * * *